No. 704,751. Patented July 15, 1902.
H. M. MARTIN.
MANUFACTURE OF SECONDARY BATTERY PLATES OF THE PLANTÉ TYPE.
(Application filed July 30, 1901.)
(No Model.)
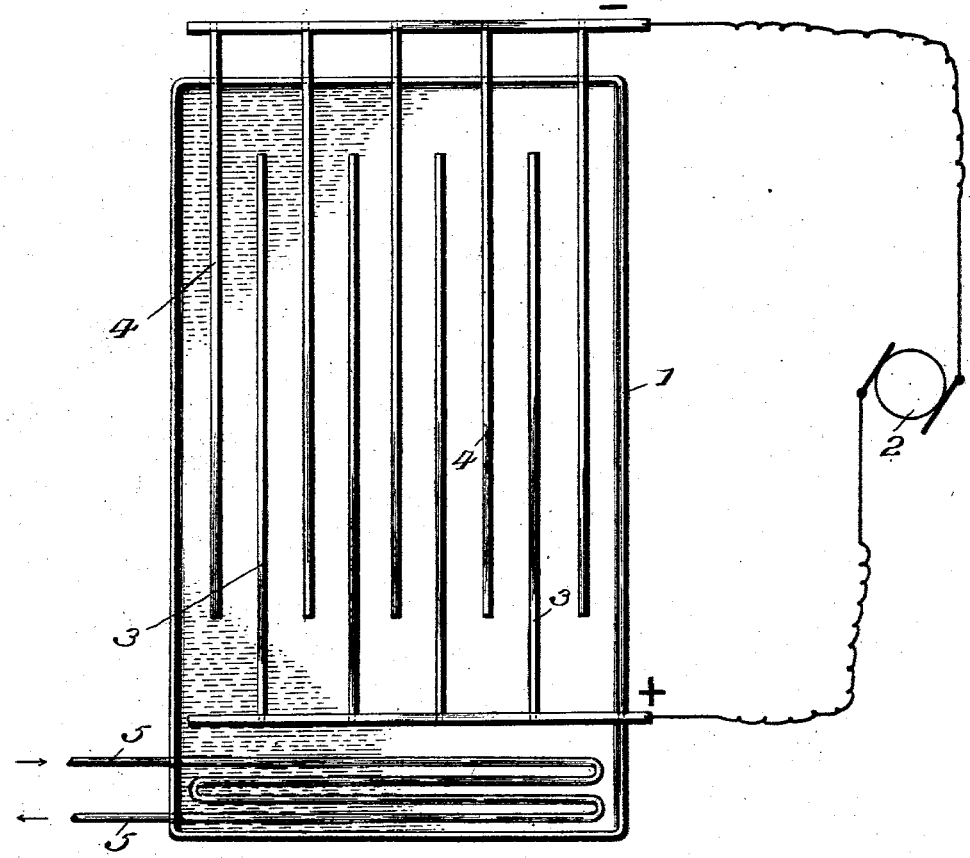
Inventor
Harold M. Martin
Witnesses
Walter Williams
Jas. A. Richmond
by
Augustus B. Stoughton
his Attorney

UNITED STATES PATENT OFFICE.

HAROLD M. MARTIN, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

MANUFACTURE OF SECONDARY-BATTERY PLATES OF THE PLANTÉ TYPE.

SPECIFICATION forming part of Letters Patent No. 704,751, dated July 15, 1902.

Application filed July 30, 1901. Serial No. 70,259. (No model.)

*To all whom it may concern:*

Be it known that I, HAROLD M. MARTIN, a citizen of the United States, residing at Philadelphia, in the county of Philadelphia and State of Pennsylvania, have invented certain new and useful Improvements in the Manufacture of Secondary or Storage Battery Plates of the Planté Type, of which the following is a specification.

In manufacturing storage-battery plates of the Planté type the lead of the lead plates is converted into peroxid of lead by electrolytic action. This process is frequently designated a "factory-forming" process as distinguished from the process of charging the battery after its completion and while it is in use. Formerly the factory formation of peroxid of lead was effected by electrolytic action in a bath slightly acidulated with sulfuric acid. Such was Planté's method. Du Jardin, United States Patent No. 497,869, and Van de Poele, United States Patent No. 285,529, suggested means for hastening and improving the factory formation of peroxid of lead on the plates; but their methods did not go into commercial use. Subsequently Griscom in United States Patent No. 515,333 pointed out a process for the accomplishment of the factory formation, which process has been widely adopted. Prior to my invention the state of the art was that it had been pointed out that current density and the character of the electrolyte were important factors in producing the factory formation of peroxid of lead in a rapid manner. The Griscom patent above referred to accurately states the proper electrolyte and the proper current density for the successful production of peroxid of lead on the plates in the factory formation; but in practicing the process of the Griscom patent different kinds of useful peroxid are produced in the factory formation.

It is the object of the present invention to improve upon the process of the Griscom patent in such a way that it is possible to produce any predetermined character of useful peroxid and in that way to make the product more uniform.

To these and other ends hereinafter set forth my invention comprises that improvement in the Griscom process for the factory formation of peroxid of lead on the plates which consists in controlling the temperature of the electrolyte.

To practice my invention I control the temperature of the electrolyte, whereby the peroxid produced in the factory formation can be made uniform and of the same kind.

For example, I proceed as is set forth in the Griscom patent above referred to, wherein it is pointed out how two of the factors—namely, the current density and the strength of the solution—enter into the result; but while so proceeding and in accordance with my invention I control the temperature of the electrolyte, and by so doing I am enabled to produce in the factory formation uniform peroxid of any predetermined kind. As an illustration of the temperature I may say that I keep the electrolyte below 115° Fahrenheit; but, as I have stated, it is possible by changing the upper limit of the temperature to produce as often as may be desired peroxid of different kind for each temperature, but of the same kind for the same temperature.

In the drawing I have illustrated diagrammatically a plan view of one kind of apparatus suitable for the practice of my invention.

In the drawing, 1 is a suitable tank adapted to contain the electrolyte, which may be substantially the electrolyte described in the Griscom patent.

2 represents electrical connections for supplying current which may be at substantially the current density set forth in the Griscom patent.

3 represents the plates upon which the peroxid is to be formed by the factory-formation process.

4 represents dummy plates, which are commonly used in this process.

5 is a coil of pipe through which a suitable medium, as water, is caused to circulate. This coil of pipe is immersed in the electrolyte, and it is an example of means for controlling the temperature of the same.

It will be obvious to those skilled in the art to which the invention relates that modifications may be made in details without departing from the spirit thereof. Hence I do not limit myself to the precise construction and arrangement of parts hereinabove set forth, and illustrated in the accompanying drawings; but,

Having thus described the nature and objects of the invention, what I claim as new, and desire to secure by Letters Patent, is—

1. In the rapid factory-formation process of making peroxid of lead on battery-plates which consists in subjecting the plates to electrolytic action in an electrolyte capable of producing the rapid formation of peroxid from metallic lead, that improvement which consists in controlling the temperature of the electrolyte during the formation, substantially as described.

2. In the rapid factory-formation process of making peroxid of lead on storage-battery plates which consists in subjecting the plates to electrolytic action in an electrolyte capable of producing the rapid formation of peroxid from metallic lead, that improvement which consists in maintaining the electrolyte during the formation below 115° Fahrenheit by abstracting heat from it, substantially as described.

In testimony whereof I have hereunto signed my name.

HAROLD M. MARTIN.

In presence of—
BRUCE FORD,
HUGH LESLEY.